United States Patent
Kiwiet

[15] 3,693,064
[45] Sept. 19, 1972

[54] NUMERICAL CONTROL SYSTEM DEPENDENT ON VECTOR MAGNITUDE

[72] Inventor: William B. Kiwiet, Beaverton, Oreg.

[73] Assignee: Tektronix, Inc., Beaverton, Oreg.

[22] Filed: March 5, 1971

[21] Appl. No.: 121,316

Related U.S. Application Data

[63] Continuation-in-part of Ser. No. 66,979, Aug. 26, 1970.

[52] U.S. Cl. ............................................. 318/571
[51] Int. Cl. ............................................. G05b 19/24
[58] Field of Search ....... 318/571, 574, 600, 601, 603

[56] References Cited

UNITED STATES PATENTS

| | | | |
|---|---|---|---|
| 3,122,691 | 2/1964 | Centner | 318/571 |
| 3,286,085 | 11/1966 | Radd | 318/571 |
| 3,530,283 | 9/1970 | McDaniel | 318/571 |
| 3,538,315 | 11/1970 | Reuteler | 318/571 |
| 3,430,035 | 2/1969 | Read | 318/571 |
| 2,927,735 | 3/1960 | Scuitto | 318/571 |
| 3,110,865 | 11/1963 | Scuitto | 318/571 |
| 3,428,876 | 2/1969 | Kelling | 318/571 |

*Primary Examiner*—Bernard A. Gilheany
*Assistant Examiner*—Thomas Langer
*Attorney*—Buckhorn, Blore, Klarquist and Sparkman

[57] ABSTRACT

A numerical control system for operating a machine tool or the like receives successive coordinate movement instructions for controlling a device such as a cutting tool. The system employs a digital differential analyzer in each coordinate axis for generating a servo rate command, while providing linear interpolation for each movement. Feedrate is digitally controlled in different coordinate axes to bring about an optimized vector feedrate. Acceleration and deceleration are digitally directed for adapting the numerical control system to the particular device operated thereby.

15 Claims, 6 Drawing Figures

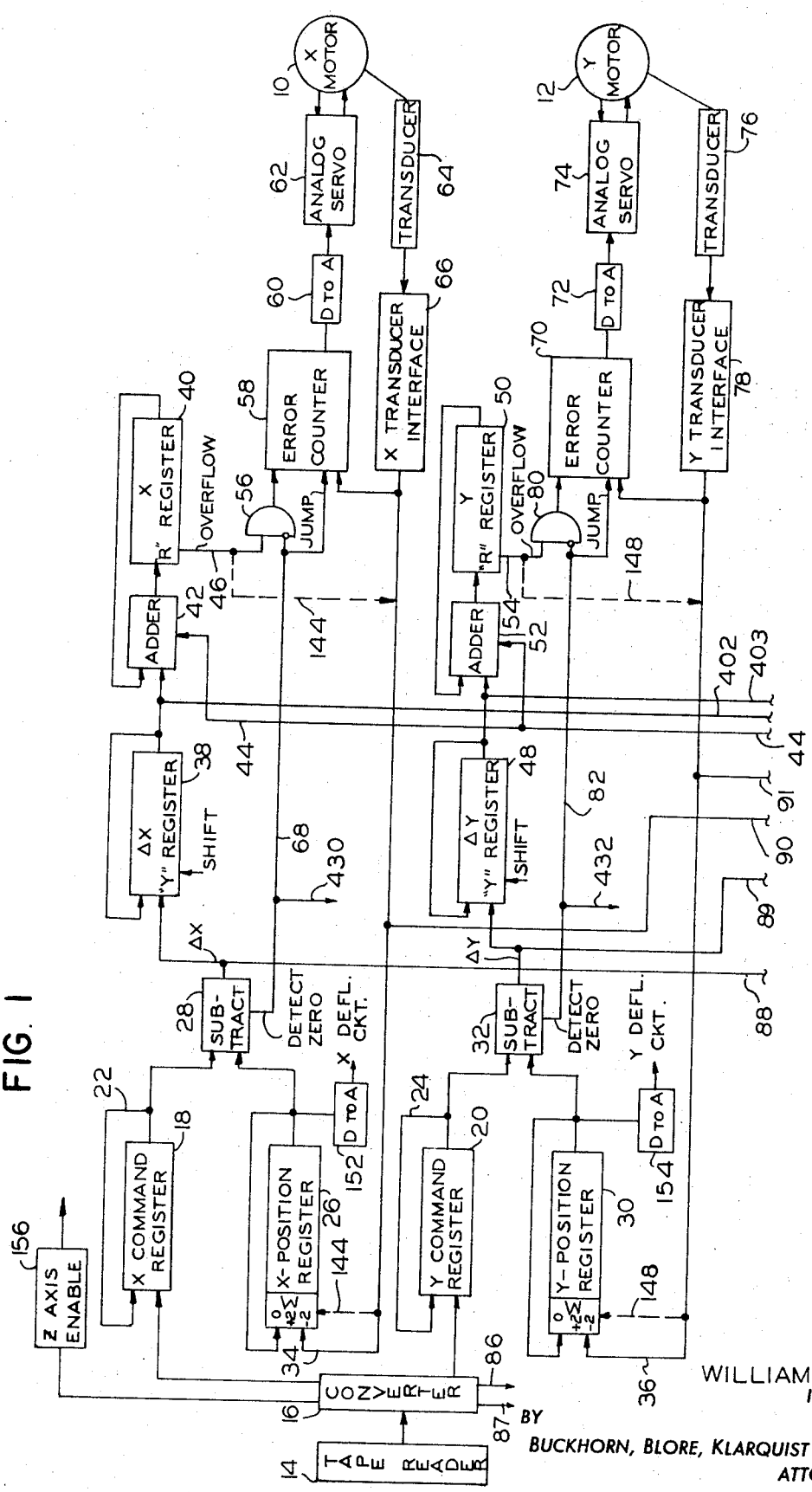

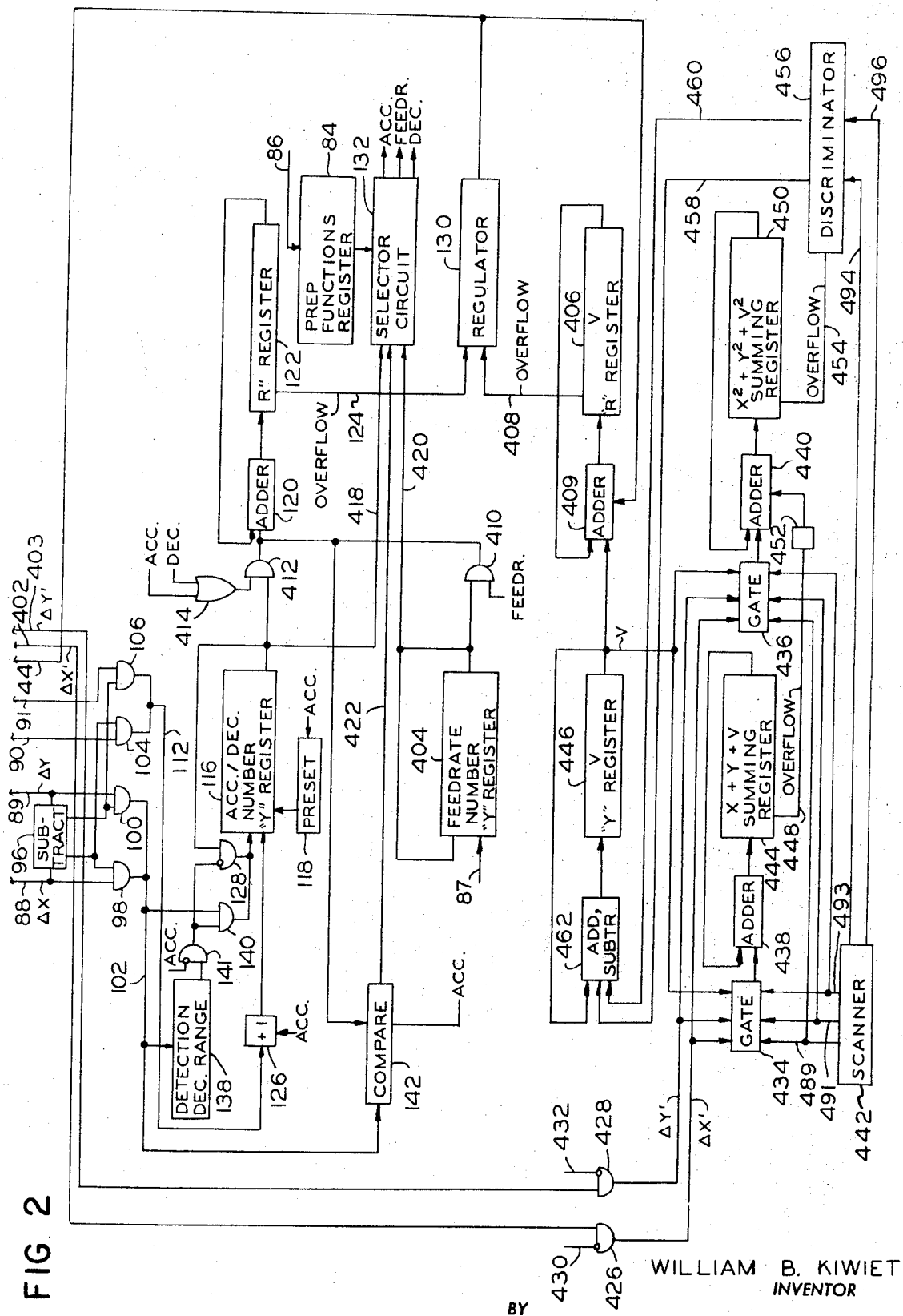

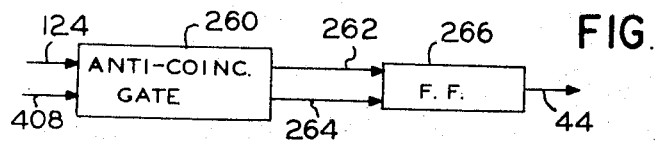
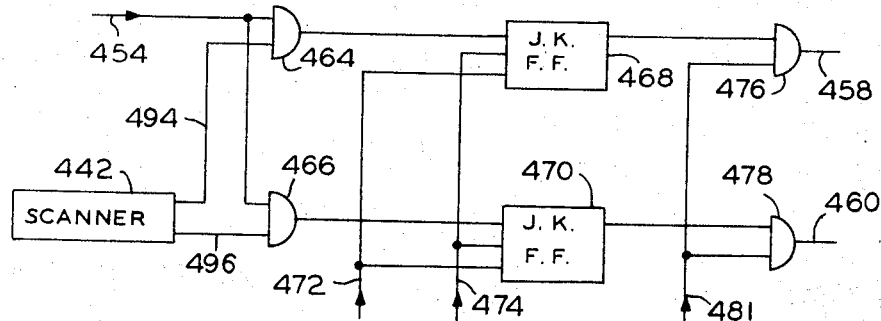
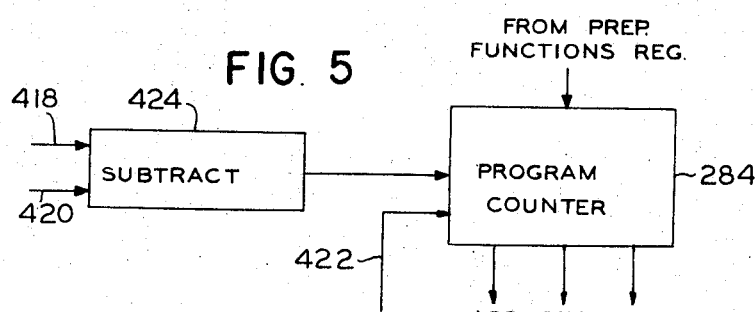
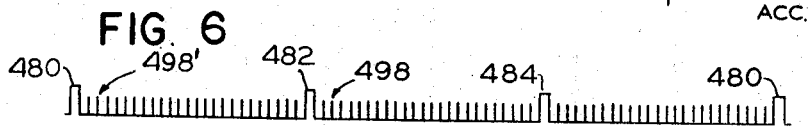

NUMERICAL CONTROL SYSTEM DEPENDENT ON VECTOR MAGNITUDE

CROSS REFERENCE TO RELATED APPLICATION

This application is a continuation-in-part of my application Ser. No. 66,979 filed Aug. 26, 1970, entitled "Numerical Control System," and assigned to the assignee of the present invention.

BACKGROUND OF THE INVENTION

By means of a numerical control system, a cutting tool or similar controlled device may be moved in two or more coordinate directions over an accurately predetermined path in accordance with digital input instructions. Typically, a set of coordinate instructions, comprising a given block of information, will direct the controlled device to move from its present position to a new position the coordinates of which are digitally expressed. The successive blocks of information cause the controlled device to move through successive segments of an overall contour.

The usual numerical control system, and the information applied thereto, must be fairly carefully adapted to the particular machine which is to be controlled. Thus, the numerical control should not produce output signals at a velocity rate such that the controlled device will be incapable of reacting thereto. The commanded velocity should not be such as will produce an undue strain on a cutting tool or workpiece. The proper velocity or feedrate can ordinarily be programmed into the numerical control system as a part of the input information. In accordance with my previous invention, such characteristics as acceleration and deceleration are made adaptive to the particular machine which is controlled.

In the numerical control system according to my prior application, velocity or feedrate input information was received, and the apparatus operated to establish this velocity or feedrate in the axis or coordinate direction of the largest move. Thus, if the difference between present position and commanded position was greatest in the X axis, the X axis feedrate was caused to achieve the programmed or input velocity or feedrate. Since actual tool feedrate is the vector sum of the feedrates in two or more axes, a change in actual velocity may be experienced from move to move unless the commanded feedrate is changed in accordance with the direction of the desired move. In order to achieve substantially constant feedrate, the feedrate command for each block of information must take into consideration the relationship between commanded feedrate in the axis of the largest move, and the relationship thereof to the actual or vector feedrate.

SUMMARY OF THE INVENTION

In accordance with the present invention, the feedrate input for each block of information may correspond to the actual feedrate desired of the machine. Thus, if a constant feedrate is desired throughout two successive blocks of input information, the same feedrate input command information may be provided on the input recording tape or the like, without regard to the successive directions of movement commanded by the successive blocks of information.

In accordance with a particular circuit of the present invention, digital means is provided for developing output information proportional to the vector sum of the repetitive output information provided in coordinate axes and supplied to control coordinate motors or the like. The repetitive output information proportional to the vector sum is controlled to correspond to feedrate input information, with the coordinate output information supplied to control coordinate motors or the like being simultaneously controlled.

Stated another way, repetitive output information is developed which is proportional to the vector sum of commanded delta moves in the respective axes. This output, along with the output information controlling machine movement, is increased or controlled until the vector sum output information produces the desired vector feedrate.

It is an object of the present invention to provide an improved numerical control system for automatically providing a desired vector velocity.

It is another object of the present invention to provide an improved numerical control system operative with simplified input information.

It is another object of the present invention to provide an improved numerical control system for achieving a desired vector feedrate by digital means.

It is another object of the present invention to provide an improved digital control system for achieving optimum velocity operation.

It is a further object of the present invention to provide an improved numerical control system for attaining optimized operation with simplified circuitry and construction.

The subject matter which I regard as my invention is particularly pointed out and distinctly claimed in the concluding portions of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a general block diagram of a numerical control system according to the present invention;

FIG. 2 is a further portion of the FIG. 1 circuit, particularly illustrating feedrate control apparatus;

FIG. 3 is a more detailed diagram of a regulator forming a portion of the FIG. 2 circuit;

FIG. 4 is a block diagram of a discriminator as employed with the FIG. 2 circuit;

FIG. 5 is a block diagram of a selector circuit utilized according to the present invention as in FIG. 2; and FIG. 6 is a waveform chart illustrating operation according to the present invention.

DETAILED DESCRIPTION

Referring to the drawings, and particularly to FIG. 1, an apparatus is illustrated for moving a controlled device along a path, such path comprising a number of segmental portions, wherein the apparatus successively receives input directive information representing each such segmental portion for causing corresponding movement of the controlled device. In a given instance the controlled device may comprise the cutting tool of a milling machine or the like adapted for movement in a first, or X, direction by rotation of X motor 10, and movement in an orthogonal direction by means of a Y motor 12. Successive movement instructions are provided upon a conventional recording tape (not shown), such as perforated paper tape, read by a tape reader 14. Successive "blocks" of information are read from the tape in a known manner, with each block including the directive information indicative of the position to which the cutting tool or other controlled device is to be moved. This information is recorded upon the tape in binary coded decimal form, along with a feedrate input value and other input instructions as hereinafter more fully described.

The input information from tape reader 14 is converted from binary coded decimal form to straight binary form in converter 16 to simplify the processing of the information, as further described in my aforementioned application Ser. No. 66,979. The X coordinate of the location to which the controlled device is to be moved is coupled into X command register 18, while the Y coordinate is transferred into Y command register 20. Each of these registers, as well as most of the other registers employed herein, suitably comprise 24 bit shift registers wherein the information stored continuously circulates, as indicated by leads 22 and 24 respectively, at a clock frequency of 2 megahertz. Shorter registers can be used in some instances where less accuracy is acceptable.

The X command register 18 together with X position register 26 and subtract circuit 28 form a first input register means according to the present invention. Similarly, Y command register 20 together with Y position register 30 and subtract circuit 32 form a second input register means according to the present invention.

The position registers 26 and 30 store the digital coordinate representations of the actual position of the controlled device. The position registers are connected as dynamic counters such that inputs provided on leads 34 and 36 respectively increase or decrease the content of the register by one unit, here indicative of 0.0002 inches, in a coordinate direction. Otherwise, the information circulates in the position registers in the same manner as hereinbefore described with respect to the command registers.

Command register 18 and position register 26 provide respective inputs for subtract circuit 28 the latter developing the difference therebetween indicated as $\Delta X$. Also a difference, $\Delta Y$, between the content of registers 20 and 30 is provided by subtract circuit 32. The subtract circuits 28 and 32 provide the digitally represented positional error in X and Y coordinate directions existing between the commanded position for a controlled device, and its actual position.

The difference, $\Delta X$ is provided as an input to a rate command means here comprising a digital differential analyzer. This digital differential analyzer develops an output pulse rate proportional to the digital error information, $\Delta X$, as well as proportional to a feedrate command. The digital differential analyzer comprises a $\Delta X$ "Y" register 38, an X "R" register 40, and an adder 42. The error information, $\Delta X$, is entered into register 38, initially in the lower order bit positions thereof, and this information is circulated as hereinbefore described in connection with register 18. The contents of register 38, after normalizing as hereinafter described, are added to register 40 by means of adder 42, after which such addition circulates through register 40 and adder 42. Addition is repeatedly accomplished at a predetermined rate (every 12.5 microseconds) as long as a feedrate command is provided adder 42 on lead 44. As a sufficient number of additions take place, register 40 will overflow providing a pulse output on lead 46, after which adding continues. The frequency of the output pulse at 46 is proportional to $\Delta X$ as well as being proportional to a feedrate input determination as hereinafter described.

Similarly, the $\Delta Y$ information is entered initially into the lower order bit positions of the $\Delta Y$ "Y" register 48 from which it is repeatedly added to the contents of Y "R" register 50 via adder 52. The frequency of the overflow at 54 will be proportional to $\Delta Y$, as well as to a feedrate command on lead 44. Elements 48, 50, and 52 comprise a second digital differential analyzer.

Since the frequency of addition is determined by a common feedrate command which is the same for each digital differential analyzer, it will be seen the outputs on leads 46 and 54 are exactly proportional to $\Delta X$ and $\Delta Y$, respectively. The outputs at 46 and 54 can then be used as rate commands to digitally operated servomechanism means for controlling motors 10 and 12, with the two rate outputs at 46 and 54 having the correct frequency ratio for causing movement of the controlled device in a constant direction for reducing error values $\Delta X$ and $\Delta Y$ to zero. The digital differential analyzers thus perform the function of linear interpolation between a present position of a controlled device and the commanded position thereof.

In order to avoid unwanted differences in rate of movement of the controlled device with the actual distance being traversed thereby during a linear movement, the contents of registers 38 and 48 are first normalized. That is, the contents of both registers 38 and 48 are moved simultaneously from the lower order bit positions of each register to the higher order bit positions until a digit in one register or the other reaches the higher order bit position thereof. At this point, shifting is stopped and operation of the digital differential analyzers may be begun. The ratio between the $\Delta X$ and $\Delta Y$ information is preserved while retaining a high overflow pulse rate substantially responsive to the feedrate command on lead 44.

The rate command information on leads 46 and 54 is provided respectively to X and Y axis digital servomechanism means. Referring first to X axis digital servomechanism means, the pulse output on lead 46 is applied through and-gate 56 to an error counter 58, the output of which is applied to a conventional digital to analog converter 60. Counter 58 as well as counter 70 are 10 bit binary reversible counters and are normally employed as a buffer for allowing position and velocity lag in the overall servomechanism. The converter 60 converts the error output into a bipolar analog voltage to drive the preamplifier of servo 62. Velocity servomechanism 62 includes power amplifier means for providing an operating input to X motor 10. Analog servomechanism 62 also receives tachometer feedback from X motor 10 and operates in a conventional manner for rotating motor 10 at substantially the dictated rate.

In a constant velocity situation, for instance, the output from error counter 58 is a constant velocity command. After digital to analog conversion, it is amplified and compared, analog-wise, with the actual velocity of the machine, detected with a tachometer. The difference operates the machine.

A transducer 64 is also connected to the output shaft of motor 10, this transducer comprising means for providing digital rate and position feedback. The transducer produces digital pulse outputs in response to analog input, phased according to direction of rotation. In a specific embodiment the transducer comprised a Baldwin shaft position encoder, Model 75Z-1, manufactured by Baldwin Electronics, Incorporated, Little Rock, Arkansas. The output of transducer 64 is coupled via X transducer interface 66, more fully described in my aforementioned application Ser. No. 66,979, as a second input to error counter 58, and as the counting input on lead 34 for register 26. Thus, as the X motor 10 responds to servo 62, transducer 64 provides pulses to error counter 58 for advancing or reducing the total count thereof toward a predetermined value for which converter 60 produces zero output, indicating compliance with the input command. The loop comprising the error counter 58, converter 60, servo 62, transducer 64, and interface 66 therefore comprises a digital rate servomechanism causing the X motor 10 to be responsive to rate information dictated by the frequency of the output pulse from the X digital differential analyzer on lead 46. Also, the digital information from the transducer 64 updates the position in register 26 whereby the ΔX output from subtract circuit 28 is eventually reduced to zero. It should be noted, however, that in the described embodiment of the invention for executing linear interpolation in response to segmental instructions, the ΔX information from subtract circuit 28 is entered into register 38 only at the start of each interpolation, that is when new information is entered into X command register 18 from converter 16, and before position register 26 responds. This will not necessarily be the case as with embodiments executing curved segment commands or the like. The present embodiment is described for greater ease of explanation. It is also understood apparatus may be provided according to the present invention operating in three axes instead of two, i.e. in X, Y, and Z directions instead of just X and Y. Timing circuitry for the apparatus according to the present invention will be well understood by those skilled in the art, and therefore will not be described herein.

When ΔX nears zero, for instance when the remaining difference reduces to one bit indicative of a position difference of less than 0.0002 inches, subtract circuit 28 provides a "detect zero" output on lead 68. The signal on line 68 inhibits gate 56 whereby error counter 58 no longer receives the overflow pulse on lead 46. Furthermore, the same signal on line 68 is employed as a "jump" command to error counter 58 whereby to set the latter to a given value for "servo-retaining" purposes. In a particular embodiment, this predetermined value was the number 512 in binary form, which, when applied to digital to analog converter 60, causes a zero input at analog servo 62. Prior to the execution of the "jump" instruction, error counter 58 may contain a count greater than or less than 512, in accordance with the direction of commanded movement and according to whether an acceleration or deceleration may have been taking place. However, upon a "detect zero" signal on line 68, the count in error counter 58 is changed to 512 and the digital servomechanism is then employed to maintain this value in error counter 58. As a consequence, motor 10 will be retained in a given position. During servo-retaining, error correcting voltage is produced proportional to positioning error. To enhance the servo-retaining mode, analog servo 62 is provided with increased amplifier gain, at this time, near its zero input value. Consequently, any tendency for movement on the part of X motor 10 will be countered by a strong output from analog servo 62 as error counter 58 changes at all from the 512 value. The servo-retaining mode, according to the present apparatus, is of appreciable value in minimizing error and providing enhanced accuracy in the directed positioning of the controlled device. It will, of course, be appreciated that each block of information on an input tape read by tape reader 14 may direct another movement of motor 10. Consequently, the servo-retaining mode may have a very short duration, or may be nonexistent as in an anticipation mode of operation, hereinafter described, wherein a nearly constant feedrate is attained from one segmental movement to the next.

The Y axis digital servomechanism similarily comprises error counter 70 driving digital to analog converter 72, which in turn provides the input to velocity analog servo 74. Transducer 76, which may be identical to transducer 64, provides an input to error counter 70 for causing error counter 70 to count in the opposite direction from the input supplied via and-gate 80 on lead 54. Normally, the pulse output 54 is counted by error counter 70 which applies a corresponding analog signal to servo 74 via converter 72. Analog servo 74 provides the power output to Y motor 12, while a tachometer operated by the motor shaft supplies the feedback to analog servo 74. Transducer 76 supplies a pulse output in response to motor rotation, which is applied to error counter 70 by way of interface 78 for changing the count in error counter 70, e.g. to the 512 value. Also, the pulse output from transducer 76 is effective through interface 78 and lead 36 for causing Y position register 30 to count for reducing the difference detected by subtract circuit 32. When the subtract circuit 32 detects a difference indicative of less than 0.0002 inches between the registers 20 and 30, a signal on lead 82 inhibits operation of gate 80 and causes error counter 70 to "jump" to the 512 value for servo-retaining in the same manner as herein described in connection with the X axis digital servomechanism.

The apparatus according to the present invention has two general modes of operation as selected by preparatory functions register 84 in FIG. 2. The first or mode A is the normal mode, for applying acceleration and deceleration for every block of input information on the tape read by reader 14. The second mode, mode B, is an anticipation mode applying acceleration in the first block only and deceleration in the last block only. For blocks in between, acceleration and deceleration may be substantially skipped and the tape reader is started before completion of the previous block, i.e. at the point in time where deceleration would occur in the normal mode A. The input instructions as to whether mode A or mode B is desired are given with each block of information on the tape, as read by tape reader 14. This information is supplied to register 84 as indicated at 86. As long as mode A is designated, each block is read, and the servo system comes to a substantial halt, with motors 10 and 12 in servo-retaining condition, before tape reader 14 is operated to read the next block of information.

The circuit of FIG. 2 is interconnected with the circuit of FIG. 1 by leads numbered 44, 86 through 91, 402, 403, 430, and 432. Leads 88 and 89 carry the $\Delta X$ and $\Delta Y$ signals from subtract circuits 28 and 32. Leads 90 and 91 provide the position feedback pulses, and leads 402 and 403 carry the outputs of registers 38 and 48, corresponding to normalized digital error information, and here designated as $\Delta X'$ and $\Delta Y'$. As hereinbefore mentioned, lead 44 delivers the feedrate command to the FIG. 1 circuit. Leads 430, 432 are explained later.

Leads 88 and 89 in FIG. 2 provide inputs for subtract circuit 96 as well as being respectively connected to and-gates 98 and 100. Subtract circuit 96 energizes one or the other of gates 98 and 100 according to whether the $\Delta X$ or the $\Delta Y$ signal is larger. If the $\Delta X$ signal is larger, gate 98 from the subtract circuit is energized for passing the $\Delta X$ output to lead 102. If, on the other hand, the $\Delta Y$ signal is larger, then gate 100 is energized to provide the $\Delta Y$ value on lead 102. Subtract circuit 96 similarly energizes a pair of and-gates 104, 106, so that position feedback information is provided on lead 112 for the axis having the larger delta.

At the beginning of each block of information in mode A, "Y" register 116 is preset to a predetermined small value by preset means 118 in accord with an acceleration command from selector circuit 132. Register 116 together with adder 120 and "R" register 122 form a digital differential analyzer operating in substantially the same manner as hereinbefore described for this type of circuitry to provide a pulse output on lead 124, the frequency of which may be proportional to the digital content of the "Y" register 116. (Alternatively, it may be proportional to the contents of register 404.) Repeated addition takes place in adder 120 at a constant rate, repeatedly adding the contents of register 116, for instance, to register 122. During acceleration, at the start of a block of input information, an add-one circuit 126 is energized providing successive increases for the value in register 116. And-gate 128 is also energized at this time to provide normal recirculation of the pulse train through register 116.

During acceleration, the number preset into register 116 via means 118 initially determines the overflow pulse rate on lead 124. This value is applied to a regulator 130 which comprises a comparison circuit. In regulator 130, the frequency of the pulse output overflow from vector "R" register 406, such pulse appearing on line 408, is compared frequency-wise with the overflow 124 from register 122. The regulator 130 then provides an appropriate feedrate command on lead 44 for controlling the axis digital differential analyzers (in FIG. 1) as hereinafter more fully described, taking into consideration the vector "V." The regulator 130 thus forms part of a means for controlling the pulse output rates on leads 46 and 54, and thus the velocity which motors 10 and 12 are required to follow. The feedrate command on lead 44 is applied to both adders 42 and 52.

Initially, the velocity rate commanded will be fairly low in accordance with a low value usually preset into register 116 by means 118. The commanded velocity of the system will remain low until a system response occurs. Then, the position feedback from the axis having the larger delta, this feedback appearing on line 112, causes add-one circuit 126 to add pulses to the contents of register 116. Each feedback pulse causes a pulse to be added. Consequently, the system will accelerate. Acceleration is adaptive, wherein further acceleration takes place as the controlled device responds. Thus, assuming the control device is a cutting tool or the like, the feedback on line 112 will indicate whether or not the cutter is responding or can respond at a prescribed rate. A machine of "low bandwidth" will be accelerated at a slower rate than a machine of "high bandwidth." Since a machine is accelerated in accordance with its capabilities, not as much data need be inserted into the apparatus according to the present invention with a change in the controlled machine, workpiece to be milled, or the like. It is preferable that the acceleration command be digitally generated rather than being generated with an analog time constant circuit. This digital generation provides a completely predictable acceleration command which can be modified to serve various applications and which will enable a smooth transition from acceleration to feedrate, etc., independent of the particular feedrate involved. It also enables smooth transition from acceleration to deceleration for short incremental moves as hereinafter more fully described. A machine can be accelerated or decelerated from any existing feedrate to a new commanded feedrate and will make a smooth transition.

In mode A, selector circuit 132 compares the number in register 116 with which the velocity commands at 46 and 54 are initially controlled, with the feedrate number in register 404 provided from the input converter 16. Register 404 receives this number on line 87 from the converter in accordance with the desired feedrate in a particular input block. It should be noted that selector circuit 132 initially provides and "ACC." output, i.e. during acceleration. When the number in register 116 reaches the commanded feedrate number in register 404, selector circuit 132 switches outputs from "ACC." to "FEEDR.", whereby the system velocity will be commanded in accordance with the directed feedrate. The "FEEDR." output of selector circuit 132 now energizes and-gate 410 in place of and-gate 412, previously enabled by the "ACC." output via or-gate 414, whereby register 404 provides a constant feedrate number input to adder 120 in place of the number from register 116. Hence, the apparatus is then controlled to maintain the desired feedrate via overflow on lead 124.

The system feedrate can be the optimum desired for the controlled device, representing the velocity of which the system is capable, with the acceleration adapting itself to the acceleration capabilities of the controlled device as hereinbefore indicated. As hereinafter also indicated, the deceleration is also adaptive and is controlled so as to arrive at the desired endpoint without overshoot, despite fairly rapid feedrate theretofore. Normally, acceleration is substantially exponential from zero velocity to feedrate, and subsequent deceleration is also substantially exponential, although these characteristics can be varied.

Operation continues at the desired feedrate until the commanded location is neared by the controlled device. A deceleration range detector 138 is coupled to receive the larger delta signal for comparison with a predetermined value which, in a constructed embodiment, was numerically equal to 0.4096 inches. When the larger delta drops below this value, detector 138 provides an output for inhibiting gate 128 and discontinuing circulation of information in register 116 (unless acceleration is commanded and inhibits gate 141). Thereupon, the same delta information is entered into register 116 by way of and-gate 140. The digital differential analyzer comprising register 116, adder 120, and register 122 now again produces an overflow pulse output on lead 124. The selector circuit 132 compares the contents of registers 116 and 404 and provides a change from "FEEDR." output of "DEC." output when the contents of register 116 becomes the lesser of the two. Alternatively, compare circuit 142, the function of which is hereinafter described, may also be employed for the latter purpose. The digital differential analyzer comprising elements 116, 120, and 122 will then command an exponential slowdown to position by way of lead 124. Thus, the delta input to register 116 will continue to decrease and consequently the overflow rate on lead 124 will continue to decrease. Smooth transition from feedrate to deceleration is accomplished, this transition being independent of feedrate, distance, or time. The deceleration range is quite long and also the final speeds during deceleration are quite low, whereby final positioning can occur without overshoot. This deceleration mode enhances the possible speed of the machine prior to deceleration, without compromising accurate positioning. Since deceleration is also proportional to the adding frequency of the digital differential analyzer comprising elements 116, 120 and 122, deceleration can be altered to make it compatible with various machine's servo deceleration capabilities in this manner.

A change in operation directly from acceleration to deceleration is required when the delta for the move is small and/or the commanded feedrate is high. During acceleration, a continuous comparison is made between delta information on line 102 and the contents of register 116. If, during acceleration, the information in "Y" register 116 equals the delta information on line 102, it indicates that deceleration should be started substantially immediately if the controlled device is to stop in time. Comparison circuit 142 detects this fact and provides a signal to selector circuit 132 causing the latter to command immediate entry of delta information into register 116 and immediate deceleration operation in the manner hereinbefore described. The selector circuit discontinues the acceleration command such that detector 138, which detects a small delta, can operate gates 140 and 128 as hereinbefore described. In this case, of course, the feedrate is never reached during the particular segmental move under consideration.

This mode of operation comprising a jump from acceleration to deceleration substantially eliminates the tendency for overshoot to occur for small deltas. Smooth transition from acceleration to deceleration takes place independent of feedrate, distance or time. Optimum time response is also maintained inasmuch as acceleration is actually continued to a "half way point" of a segment movement, before deceleration starts to take place.

In mode B, as commanded in preparation functions register 84 from the tape reader 14 and converter 16, acceleration will take place only in the first block of information on the tape containing a mode B instruction, and the tape reader is started before the completion of the block for reading in new instructions. This occurs when the deceleration range is detected by detector 138. However, the output of detector 138 is otherwise normally inhibited for this mode. The selector circuit 132 is commanded by preparation functions register 84 to continue the feedrate. Acceleration or deceleration may also be commanded when there is a change in commanded velocity from one block to the next. In a particular embodiment, the controlled device can then accelerate or decelerate adaptively to the new velocity, i.e. until the desired feedrate is reached.

A rapid checking mode is provided for verification of a perforated paper tape read by tape reader 14. In addition, the checking mode may be employed for monitoring subsequent machine operation to see if it is in accord with a previously verified tape. The checking system is not only quite fast but is less costly than known tape checkout methods.

According to the input checking mode of the present apparatus, internal feedback is employed by providing a closed loop which does not include an actual mechanical servo drive and position feedback. The servo drive is disabled at this time. Referring to FIG. 1, the pulse output of register 40 is coupled directly as an input to X position register 26, indicated by dashed lines 144. Also, pulse output of register 50 is connected directly as an input of Y position register 30 as indicated by dashed lines 148. The system operates to "line up" the respective position and command registers, with position checking information being taken from the respective position registers. Input data other than on punched tape can be checked.

The position register output information is supplied to a display means, desirably comprising a bistable cathode ray storage tube. The X deflection circuit for such storage tube is controlled from X position register 26 by way of digital to analog converter 152, while the Y deflection circuit for such storage tube is controlled by Y position register 30 via digital to analog converter 154. Z axis enable information is derived from the tape as translated by converter 16 and applied to Z axis enable circuit 156. The latter is effective for controlling the presentation of an electron beam for producing a trace corresponding to the segmental movement instructions for each block of information on the tape, as desired. The apparatus for this mode of operation is further described in my above mentioned application.

SELECTOR CIRCUIT

Selector circuit 132, as referred to in the FIG. 2 block diagram, is illustrated in greater detail in FIG. 5.

This circuit receives instructions from the preparation functions register 84 which in turn receives information from converter 16 and the input tape. The instructions from the preparation functions register operate a program counter 284 which steps through the following procedural levels for operating overall control and timing circuitry (not shown).

These counting steps are as follows:
0 Stop, Read
1 Select sign of command minus position
2 Load deltas into registers 38 and 48
3 Normalize registers 38 and 48
4 Stop
5 Accelerate
6 Feed
7 Decelerate
8 Possible external cycle
9 Possible external cycle After the sequence of steps is executed, the sequence is repeated, i.e. for reading each additional block of information on the input tape followed by executing the instructions given thereby. During mode B, as soon as deceleration would ordinarily be initiated in step 7, the counter directs tape reading followed by steps 1,2 and 3, but skipping steps 4 and 5, for maintaining a substantially continuous feed.

During mode A, wherein acceleration and deceleration are programmed for each block of input information, the program counter 284 is also responsive to the outputs of registers 116 and 404 on leads 418 and 420 respectively. The FIG. 5 selector circuit detects whether the output of register 116 on lead 418 is larger or whether the output of register 404 on lead 420 is larger, and may direct program counter 284 to change its output from one directing acceleration to one directing feed, or to provide a change from feed to deceleration. If the output on lead 418 becomes larger than the output on lead 420, subtractor 424 provides a first transition signal to program counter 284. If the output on lead 418 becomes less than the output on lead 420, subtractor 424 provides a second transition signal to program counter 284. The program counter is stepped by these transitions, e.g. from acceleration to feedrate, and from feedrate to deceleration. Appropriate outputs, marked ACC., FEEDR., and DEC., are provided. The FIG. 5 circuit provides outputs in accordance with whether acceleration, deceleration, or feedrate operation is desired.

If compare circuit 142 so dictates, a signal is provided on lead 422 for jumping the program counter past step 6 indicated above, directly to deceleration, for the case when very short segmental movements are indicated and wherein deceleration should occur sooner in order to avoid overshoot.

REGULATOR

Regulator 130, as indicated in FIG. 2, is illustrated in greater detail in FIG. 3. The input on lead 124 to anti-coincidence gate 260 normally sets flip-flop 266 via lead 262, whereby an output is provided on line 44 causing adders 42 and 52 in FIG. 1 to operate at a 80 kilohertz rate. Adder 409 is similarly controlled. The signal on lead 408 resets the flip-flop 266 via anti-coincidence gate input 258 and lead 264. The anti-coincidence gate 260 prevents switching of flip-flop 266 if inputs arrive on leads 124 and 408 at the same time. Anti-coincidence gate 260 operates only if controlled device velocity is fairly high, and prevents improper system operation by preventing premature setting and resetting of the flip-flop.

VECTOR RATE CONTROL

In accordance with the present invention, the rate or velocity of the machine tool or the like operated with motors 10 and 12 is controlled to correspond to the desired predetermined velocity in a resultant or vector sense. Thus, if a given feedrate is dictated from the input recording tape, motors 10 and 12, operating in different, perpendicular, coordinate axes, will combine to provide the dictated resultant velocity for the tool or the like operated by both motors 10 and 12.

First, a vector, V, is digitally generated, wherein V is the vector sum of the displacements originally commanded for the segmental move. In particular, the normalized delta outputs from registers 38 and 48 in FIG. 1 are coupled via leads 402 and 403 respectively to and-gates 426 and 428 in FIG. 2. These normalized delta outputs are designated $\Delta X'$ and $\Delta Y'$, and are substantially constant for each segmental move, in the case of a particular embodiment of the present invention. Disabling leads 430 and 432, connected to the and-gates, are normally inactive and will be considered subsequently.

The outputs of gates 426 and 428 are applied to adders 438 and 440, respectively, through gates 434 and 436. Gates 434 and 436 apply values $\Delta X'$, $\Delta Y'$, and V, successively and repetitively to adders 438 and 440 under the control of scanner 442. Thus, the contents of register 38 in FIG. 1 is first added to summing register 444 in FIG. 2, after which the contents of register 48 are added to summing register 444. Then, the numerical contents of V "Y" register 446 are added to summing register 444. The operation is successively repeated.

Summing register 444, which is designated the X+Y+V summing register in FIG. 2 for convenience, together with adder 438 and register 38, or alternatively register 48, in FIG. 1 form a digital differential analyzer producing an overflow on lead 448. It is noted the output of summing register 444 is applied as a recirculated input to adder 438. An overflow on lead 448 may be generated after any addition of $\Delta X'$, $\Delta Y'$, or V to the contents of register 444. However, on the average, overflow pulses generated after the addition of $\Delta X'$ are proportional to the value of $\Delta X'$, overflow pulses generated after addition of $\Delta Y'$ are proportional to the value of $\Delta Y'$, and overflow pulses generated after the addition of V are proportional to the value of V. Thus, overflow frequencies are generated proportional to the values of $\Delta X'$, $\Delta Y'$, and V, respectively and successively. Separate digital differential analyzers could be employed for the purpose, but the present arrangement is very economical in its use of components.

The inputs $\Delta X'$, $\Delta Y'$, and V are also applied to adder 440 through gate 436, as hereinbefore mentioned, with gate 436 also being under the control of scanner 442. Thus, these quantities are successively added to summing register 450, which is designated the $X^2 + Y^2 + V^2$ summing register in FIG. 2 for convenience. The overflow frequency on lead 448 controls the adding rate of adder 440 with an overflow pulse being lengthened by pulse stretching means 452. It is noted that scanner 442 couples the ΔX' lead to both adders 438 and 440 substantially at the same time, so the addition of ΔX' occurs both places. Register 450 together with adder 440 and either register 38 or register 48 in FIG. 1 or register 446 in FIG. 2 may be considered as a digital differential analyzer. It is noted the output of register 450 is applied as an input of adder 440.

The overflow frequency on lead 454 from register 450, responsive to the ΔX' input, is proportional to $(\Delta X')^{2aw}$. This comes about since the overflow frequency on lead 448 is then proportional to ΔX', this overflow frequency controlling the adding rate of adder 440. At the same time, ΔX' is provided as an input to be added by adder 440. As a result, the overflow frequency generated on lead 454 at this time is proportional to $(\Delta X)^2$. The output on lead 454 is successively proportional to $(\Delta X')^2$, $(\Delta Y')^2$, and $V^2$, as the different quantities are added by adders 438 and 440.

The overflow on load 454 is applied to discriminator 456, which will hereinafter be more fully described. Discriminator 456 provides a subtract output on lead 458 in response to a $V^2$ overflow. Discriminator 456 supplies an add output on lead 460 in response to a $(\Delta X')^2$ or $(\Delta Y')^2$ overflow on lead 454.

The output on lead 458 comprises small numbers which are successively subtracted from the contents of V "Y" register 446 via add-subtract circuit 462, with the output of register 446 also being recirculated to the input of circuit 462. Also, the output on lead 460 of discriminator 456 comprises small numbers which are added to the contents of V "Y" register 446 via add-subtract circuit 462. Register 446 together with adder 409 and V "R" register 406 form a V or vector digital differential analyzer.

The output, V, of register 446 is supplied as one of the inputs to gates 434 and 436 as hereinbefore mentioned. It will be seen that the contents of register 446 are adjusted by add-subtract circuit 462 until V reaches a value such that $V^2 = (\Delta X')^2 + (\Delta Y')^2$ or $V = \sqrt{(\Delta X')^2 + (\Delta Y')^2}$. Thus, V equals the vector resultant of ΔX' and ΔY'. Until these equalities are satisfied, the outputs on leads 458 or 460 will be unbalanced, causing the V register 446 to attain the correct vector resultant. This vector output of register 446 is then used as a basis for generating an overflow signal on lead 408 for comparison with the feedrate commanded overflow on lead 124.

Regulator 130 not only provides the feedrate command on lead 44 for operating the adders 42 and 52, but also provides the same output for controlling adder 409. Regulator 130 tends to provide outputs such that for each overflow pulse on lead 124, the digital differential analyzer comprising elements 406, 409 and 446 applies a corresponding overflow pulse on lead 408. However, the latter overflow is based upon or proportional to the resultant displacement or vector sum of ΔX' and ΔY'. It will be seen that the feedrate command on lead 44 applied to the axis digital differential analyzers in FIG. 1 will produce overflow pulses therefrom, the vector sum of which provides the desired velocity as commanded by the overflow on lead 124 in FIG. 2. It will be seen, for instance, that the larger the vector, V, the smaller the feedrate command on the lead 44. If, for instance, ΔX' and ΔY' were equal, producing the largest vector sum, the overflow on lead 408 would more quickly equal the overflow on lead 124, for decreasing the feedrate command on lead 44. Both motor 10 and motor 12 contribute to the desired resultant velocity. If, on the other hand, ΔY' is zero, then V = ΔX', assuming ΔX' is not also zero. Then, the X axis digital differential analyzer comprising elements 40, 42, and 38, will be commanded such that the X motor 10, alone, provides the desired velocity. It is seen the feedrate command and the motor velocities are inversely related to V.

Disabling leads 430 and 432 are connected, as indicated in FIG. 1, to "detect zero" outputs of subtract circuits 28 and 32. Thus, when the remaining distance to the commanded position becomes small in a given axis, the system is switched to provide a vector, V, equal to the remaining delta in the other axis. This causes enhanced positioning in the remaining axis toward the end point at a predetermined decelerating velocity.

It should be noted that the vector circuitry is effective not only during feedrate operation, i.e. when the feedrate is dictated from the input recording tape, but also during acceleration and deceleration operation. The overflow on lead 124 will, in any case, represent the prescribed or digitally generated feedrate factor for acceleration, feedrate, and deceleration conditions.

The advantages of the present invention are manifold. The true feedrate may be directed by a feedrate number provided for each block in information on the input recording tape. This number is such that, when entered in register 404, the desired tool velocity results. The actual numerical proportion between the feedrate number, on the one hand, and actual linear velocity on the other will depend on circuitry details, as well understood by those skilled in the art. The vector velocity of the controlled tool will remain constant, so long as the feedrate number remains constant from block to block. Of course, if deceleration to stop and acceleration are dictated between blocks of information, the tool velocity will remain the same only as between feedrate portions of the cycle, assuming the feedrate number is the same. The feedrate number need not be scaled down in such a manner as to take into consideration velocities in a remaining axis or axes, since the true vector velocity is commanded in each case. Consequently, the system may operate at optimum velocity without fear of commanding a velocity which the commanded machine will be incapable of carrying out. Neither does the commanded feedrate number have to be calculated in advance in order to account for the angle of the commanded segmental move with respect to each of the axes, since the apparatus will correctly carry out the desired or commanded velocity.

DISCRIMINATOR

Discriminator 456 is illustrated in greater detail in FIG. 4. The overflow signal from summing register 450 on lead 454 is applied to JK flip-flop 468 through and-gate 464, and to JK flip-flop 470 through and-gate 466. Scanner 442, hereinbefore mentioned, provides enabling inputs to and-gates 464 and 466. A clock signal on lead 474 is applied to the flip-flops. The outputs of and-gates 464 and 466 provide "set" signals to flip-flops 468 and 470 respectively, while the input on lead 472 provides "reset" signals thereto. The outputs of flip-flops 468 and 470, indicating the "set" condition thereof, are respectively applied to the aforementioned outlet output leads 458 and 460 through and-gates 476 and 478. And-gates 476 and 478 are provided a count validation timing signal on lead 481.

Operation of the FIG. 4 circuit, as well as operation of the FIG. 2 circuitry, will be better understood by consideration of the FIG. 6 waveform chart. This is a composite chart illustrating the time positions of master control pulses 480, 482, and 484, and the time positions therebetween of bits forming binary numbers as may be stored and recirculated in the various registers. The scanner 442 successively enables the ΔX', ΔY', and V input leads to gates 434 and 436 at the time of successive master control pulses, and for the duration of a cycle lasting until the next master control pulse. Thus, the ΔX' inputs to gates 434 and 436 may be enabled by master control pulse 480, while the ΔY' inputs are enabled by pulse 482, and the V input is enabled by pulse 484. The overall sequence then starts over again with pulse 480 (duplicated on the drawing) enabling gates 434 and 436 to provide ΔX' values to adders 438 and 440, etc. As will be well understood by those skilled in the art, the scanner 442 must actually provide differently timed enabling signals to gates 434 and 436, and discriminator 456, to take into account timing delays as may occur between these elements. The diagram indication of application of scanner output to gates 434, and 436 as well as discriminator 456 is indicative of the functional control of these elements by the scanner, and the actual circuitry involved is naturally more complex.

In general, at the occurrence of master control pulse 480, scanner 442 provides a signal 488 on lead 489 enabling gate 434 to provide the ΔX' input to adder 438 and enabling gate 436 to provide the ΔX' input to adder 440. At the occurrence of master control pulse 482, scanner 442 enables the ΔY' input by an enabling signal 490 on lead 491. Similarly, at the occurrence of master control pulse 484, an enabling signal 492 is provided on lead 493 for gating the input, V.

For the duration of the enabling inputs 488 and 490, scanner 442 provides an enabling input for gate 466 (in FIG. 4) on lead 496. On the other hand, for the duration of enabling signal 492, the scanner 442 provides an enabling input to gate 464 on lead 494.

The overflow signal on lead 454 is "stretched" by means not shown, and provides a "set" signal to flip-flop 470 in FIG. 4, if an overflow from register 450 occurs during the cycle represented by enabling signal 488. A clock pulse is then provided on lead 474 at the end of the cycle whereby the JK flip-flop 470 is set to provide an output to gate 478 if an overflow has occurred on lead 454 in the cycle between master control pulses. This clock pulse may be substantially coincident with the beginning of the next master control pulse, e.g. pulse 482 in FIG. 6, occurring after addition of ΔX' by adders 438 and 440. During the next cycle (i.e. just after control pulse 482), the flip-flop 470 then provides an input to gate 478. A count validation is then supplied on lead 481 at a bit time indicated at 498 in FIG. 6. An output pulse is coupled at this time on lead 460 which comprises an input to add-subtract circuit 462. The count validation input is arranged to occur at a second bit position corresponding to a binary two or $2^1$. A binary two is added to the binary number in register 446. At a time which may be immediately after occurrence of a count validation pulse on lead 481, a reset pulse is applied to flip-flops 468 and 470 on lead 472.

In the particular instance of the example depicted in FIG. 6, no overflow occurred on lead 454 corresponding to the additions of ΔY'. If an overflow had occurred due to the addition of ΔY', a similar addition of a binary two would have also occurred by means of add-subtract circuit 462 subsequent to control pulse 484. The, when adders 438 and 440 add the vector V value to registers 444 and 450, gate 464 will be energized by an input corresponding to signal 492 on lead 494, and lead 496 will no longer be energized. If an overflow then occurs on lead 454, the stretched overflow pulse will provide a set signal to flip-flop 468 instead of flip-flop 470. Then, a subsequent clock pulse on lead 474, e.g. at the beginning of the next master control pulse 480, establishes a set output from flip-flop 468 applied to and-gate 476. A count validation then received on lead 481 will produce an output on lead 458 at time 498' in FIG. 6, in the next cyclical operating sequence, for subtracting two from the contents of register 446 via add-subtract circuit 462.

It will be seen that overflow outputs on lead 454, proportional to $(\Delta X')^2$ or $(\Delta Y')^2$, will cause a two to be added to register 446, while the occurrence of an overflow on lead 454 proportional to $V^2$ causes a two to be subtracted from register 446. Register 446 will provide an output, V, for application to gates 434, 436 which will bring about equality between $V^2$ and $(\Delta X')^2 + (\Delta Y')$, in feedback fashion. Therefore, the correct value of the vector V, equaling the resultant of the two deltas, will be repeatedly added to register 406 by adder 409, with register 406 then producing an overflow indicative of the machine's true resultant velocity. Regulator 130 changes the feedrate command on lead 44 to adjust this velocity to the desired value as dictated by the overflow on lead 124, as hereinbefore described, by changing adding rates.

As hereinbefore mentioned, the circuitry in accordance with the present invention is illustrated for operation in two axes, but it is understood that a third may be similarly controlled. Moreover, while linear interpolation in the case of each segment of a general contour is herein indicated, more complex or curved segments can be generated by known means.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Apparatus for moving a controlled device along a segment of a path in accordance with coordinate difference input information, said path comprising a number of segmental portions, said apparatus comprising:

means for developing repetitive output information in at least two axes, said information being proportional to the coordinate input information for each of said segmental portions, said controlled device being responsive in movement in said two axes to said repetitive output information.

means also responsive to the coordinate input information for developing a digital quantity proportional to the vector resultant of the coordinate input information, digital differential analyzer means for providing an additional repetitive output in proportion to said digital quantity, means for adjusting an adding rate input to said digital differential analyzer means for causing said additional repetitive output to correspond to a desired feedrate, and means for simultaneously applying the same control input in control relation to the means for developing repetitive output information in the two axes.

2. Apparatus for moving a controlled device along a path, said path comprising a number of segmental portions, wherein the apparatus successively receives coordinate input information for directing a corresponding movement of said controlled device, said apparatus comprising:

input register means for receiving said input information and providing a digital positional error indication in at least two axes between input information and the actual position of said controlled device, rate command means responsive to said digital error information for generating pulse outputs in two axes ratioed according to the positional error in said two axes, digital servomechanism means, and positioning motors operated thereby, responsive to said pulse outputs to provide movement of said controlled device, feedback means actuated by said movement of said controlled device to provide feedback pulse information in response thereto, means for coupling said feedback pulse information to said input register means for updating and reducing said error indication, means for providing a desired feedrate input value, digital differential analyzer means responsive to said digital error indication for generating a pulse output representative of a vector resultant velocity for said controlled device wherein said vector resultant velocity is proportional to the vector resultant of the positional error indication in said axes, means responsive to said feedrate input value and to the pulse output of said digital differential analyzer means for generating a feedrate command causing the said digital differential analyzer means to produce an output pulse rate in accordance with said feedrate input value, and means for also applying said feedrate command to said rate command means in said two axes to produce output pulse rates therefrom the resultant of which is responsive to said feedrate input value.

3. A circuit for providing the vector sum of a plurality of input quantities comprising:

a vector register, first digital differential analyzer means for repeatedly adding said input quantities and the output of the vector register and providing an addition overflow proportional to the various quantities added, second digital differential analyzer means for repeatedly adding said input quantities as well as the output of the vector register at a rate determined by the overflow frequency of the first digital differential analyzer means, means for increasing the contents of said vector register in response to overflow from said second digital differential analyzer means corresponding to addition of said plurality of input quantities, and means for reducing the contents of said vector register in response to an overflow from said second digital differential analyzer means corresponding to the addition of said output of the vector register.

4. The circuit according to claim 3 wherein said first and second digital differential analyzer means each comprise digital differential analyzers time shared for receiving said plurality of input and vector values.

5. Apparatus for moving a controlled device along a segment of a path in accordance with coordinate difference input information, said path comprising a number of segmental portions, said apparatus comprising:

means for developing repetitive output information in two axes, said information being proportional to the coordinate input information for each of said segmental portions, said controlled device being responsive in movement in said two axes to said repetitive output information, digital means for developing repetitive output information proportional to the repetitive output information in two axes summed vectorally with respect to the two axes, said digital means comprising a digital differential analyzer and means for providing the square root of the sum of the squares of said coordinate input information as an input to said digital differential analyzer, and means for controlling said digital means as well as said means for developing repetitive output information in said two axes so that said vector sum corresponds to a desired feedrate value for establishing the actual feedrate of said controlled device at such value, said means for controlling said digital means comprising a regulator responsive to a desired feedrate value as well as responsive to the overflow output of said digital differential analyzer for providing an adding rate input to said digital differential analyzer causing said overflow output to correspond with the desired feedrate value.

6. The apparatus according to claim 5 wherein the means for developing repetitive output information in two axes comprises a pair of digital differential analyzers receiving the adding rate input from the regulator.

7. Apparatus for moving a controlled device along a segment of a path in accordance with coordinate difference input information, said path comprising a number of segmental portions, said apparatus comprising:

means for developing repetitive output information in two or more axes, said information being proportional to the coordinate difference input information for each of said segmental portions, said controlled device being responsive in movement in said two axes to said repetitive output information, digital differential analyzer means for developing repetitive output information proportional to the coordinate difference input information in two axes summed vectorally with respect to the two axes, and means for making a comparison between the vector sum and a desired feedrate value, and in response to such comparison controlling said digital differential analyzer means as well as said means for developing repetitive output information in said two axes so that said vector sum corresponds to a desired feedrate value to establish the actual feedrate of said controlled device at such value.

8. The apparatus according to claim 7 wherein said means for making a comparison and controlling said digital means comprises a regulator responsive to a desired feedrate value as well as responsive to the overflow output of said digital differential analyzer means for providing an adding rate input to said digital differential analyzer means causing said overflow to correspond with the desired feedrate value.

9. The apparatus according to claim 8 wherein the means for developing repetitive output information in two axes comprises a pair of digital differential analyzers receiving the adding rate input from the regulator.

10. The apparatus according to claim 7 including means for providing an input in said digital differential analyzer means comprising second digital differential analyzer means for producing output frequencies proportional to said coordinate input information and to the square root of the sum of the squares of said coordinate input information as applied in feedback fashion from the first mentioned digital differential analyzer means, third digital differential analyzer means responsive in adding rate to said output frequencies of said second digital differential analyzer means and receiving said coordinate input information and said square root of the sum of the squares as applied in feedback fashion, for producing output frequencies proportional to the squares thereof, and further including means responsive to the last mentioned output frequencies for adjusting said square root of the sum of the squares in the first mentioned digital differential analyzer means until the square thereof equals the sum of the squares of the coordinate input information.

11. The apparatus according to claim 10 including discriminator means for adding to the input in the first mentioned digital differential analyzer means in response to an overflow from the third digital differential analyzer means proportional to the squares of coordinate input information, and for subtracting from the input in said first mentioned digital differential analyzer means in response to an overflow from the third digital differential analyzer means proportional to the square of said square root of the sum of the squares.

12. The apparatus according to claim 11 wherein each of said second and third digital differential analyzer means comprises a single digital differential analyzer timed shared for number inputs applied thereto.

13. The apparatus according to claim 7 wherein said means for developing repetitive output information in two axes comprises input register means for receiving new input information and providing said difference input information in at least two axes between new input information and the actual position of said controlled device, and rate command means responsive to said difference information for generating pulse output information in two axes ratioed according to the positional error in said two axes, said apparatus further including digital servomechanism means, and positioning motors operated thereby, responsive to said pulse output information to provide movement of said controlled device, feedback means actuated by said movement of said controlled device to provide feedback pulse information in response thereto, means for coupling said feedback pulse information to said input register means for updating and reducing said difference information, and means for providing the desired feedrate input value.

14. The apparatus according to claim 7 wherein said digital differential analyzer means comprises a vector register, a digital differential analyzer for repeatedly adding input quantities and the output of the vector register and providing an addition overflow proportional to the various quantities added, an additional digital differential analyzer for repeatedly adding said input quantities as well as the output of the vector register at a rate determined by the overflow frequency of the first mentioned digital differential analyzer, means for increasing the contents of said vector register in response to overflow from said additional digital differential analyzer corresponding to addition of said input quantities, and means for reducing the contents of said vector register in response to an overflow from said additional digital differential analyzer corresponding to the addition of said output of the vector register.

15. The circuit according to claim 14 wherein said digital differential analyzers each comprise digital differential analyzers timed shared for receiving a plurality of input and vector values.

* * * * *